United States Patent [19]

Chuang

[11] Patent Number: 4,647,838

[45] Date of Patent: Mar. 3, 1987

[54] PHASE CONTROLLER

[76] Inventor: Ching-Piao Chuang, 29, Sheng An 3nd St., Pei Ch'ang Ts'un, Chi An Hsiang, Hua Lien Hsien, Taiwan

[21] Appl. No.: 775,261

[22] Filed: Sep. 12, 1985

[51] Int. Cl.[4] ............................. G05F 5/00; H02H 3/26
[52] U.S. Cl. ...................................... 323/212; 361/77; 307/127
[58] Field of Search .................. 323/212, 218, 219; 361/76, 77, 161–162, 185, 191, 195; 307/127

[56] References Cited

U.S. PATENT DOCUMENTS

| 3,727,103 | 4/1973 | Finch et al. | 307/127 X |
| 3,783,354 | 1/1974 | Fletcher et al. | 307/127 X |
| 3,875,463 | 4/1975 | Reuter et al. | 361/77 X |
| 4,021,704 | 5/1977 | Norbeck | 307/127 X |

Primary Examiner—Peter S. Wong
Attorney, Agent, or Firm—Browdy and Neimark

[57] ABSTRACT

A phase controller of a type consisting of two magnetic contact units, a phase shifting mechanism for a thermal relay, a biasing circuit, a control circuit and a delay circuit, whereby phase shifting by the phase shifting circuit and three-phase currents, in coordination with the biasing effects due to the biasing circuit, alters the peak voltage of the alternating currents flowing past the phase-setting relay, to convert the state of the contacting points so as to incite the magnetic contacts in the phase conversion unit following a change in phase of the three-phase power source, thus maintaining the output end of the power source at a certain phase in a manner convenient and safe enough by all standards.

4 Claims, 3 Drawing Figures

PHASE CONTROLLER

SUMMARY OF THE INVENTION

The present invention provides for a device whereby the output can be maintained at a certain phase condition irrespective of the phase characteristics at the input, thus achieving convenience and safety in use.

In a multiple-wire wiring system each wire, that is, each lead, has its own phase. In a motor utilizing multiple-phase power for transmission, such as a three-phase series-incited motor, the motor's running direction is directly related to the incoming phase. In other words, the motor's running direction will change as a result of a change in the incoming phase; that is why for machinery and installations designed to run in a given direction it has been a common practice to test the correctness of the phase by transient electric transmission during the trial running period, with necessary steps taken to change the phase if the phase is found to be inconsistent as shown by a running in the false direction. Yet because the master power switch panel, typically installed on the distribution panel, is usually located at some distance from the job site so that the phase change work that is basically simple enough will involve the workers running to and fro repeatedly before it comes to a conclusion, some reckless workers would betake themselves to change the phase right on the spot, as was sometimes the case, resulting from time to time in shocks and shorts, and thus causing injuries to people and damage to the instrument. This is a situation that deserves particular attention in engineering units and on-job sites, due to frequent change of the job sites where the equipment must move accordingly, and each time a working site is moved, a great deal of planning is required for removal and installation at the new job site. Thus the inconvenience of operation and overconcern about safety arise for each occasion when testing on the running direction, directly related to phasing, is conducted upon completion of wiring connection at a new job site.

With the many years of service and experience gained in working in engineering units, the inventor realized the shortcomings and disadvantages such as those defined above in connection with wiring of apparatuses having specific phasing requirements and started to work for, eventually with success, the present invention titled Phase Controller to eliminate all the disadvantages associated with present and existing systems and practices or operation.

OBJECTS OF THE PRESENT INVENTION

Accordingly the primary object of the present invention is to provide for a device which permits a certain phase to be maintained at the output end permanently with all convenience and safety guaranteed without the so-called phase change intervention.

A further object of the present invention lies in the provision of a phase controller capable of protecting against phase deficiency and shorts so as to help maintain the loaded side in a normal, operative condition at all times.

Other features and advantages of the present invention will emerge from the following descriptions of embodiments given by way of illustration but not in any way limiting, with reference to the accompanying drawings in which:

DETAILED DESCRIPTION

Figure 1:
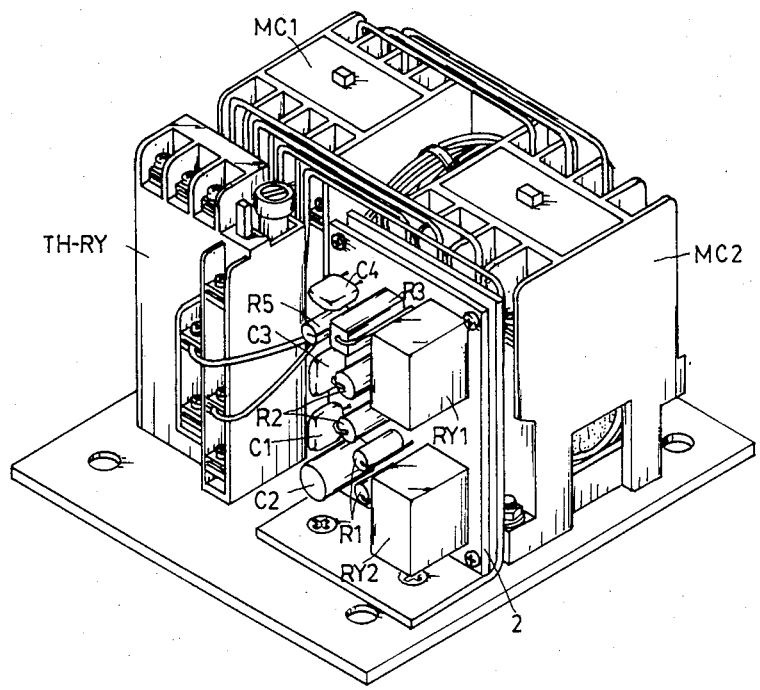
FIG. 1 illustrates, in three-dimensional perspective, the phase controller of the present invention.

Referring to FIG. 1, the invention incorporates in part two Magnetic Contact Pieces, a Thermal Relay and a circuit board for the Control Circuit. One Magnetic Contact Piece MC1 works in-phase, while the other Magnetic Contact Piece MC2 works out-of, or opposite to, the phase of Magnetic Contact Piece MC1. Each Magnetic Contact Piece comprises three sets of input and output contact points "a" which in most cases remain in the on position (i.e., connected with power), and an inciting coil. The working principle of a Magnetic Contact Piece (such as Magnetic Contact Piece MC1) lies in the inciting of coils by currents passing through such coils so as to induce movement of a movable core, bearing contact points, such that the contact points of the core are selectively aligned with corresponding contact points of the Magnetic Contact Piece. Magnetic Contact Piece MC2 works on the same principle as Magnetic Contact Piece MC1, and therefore is not given further description. The thermal Relay TH-RY serves as a protector for phase deficiency or shorts in the circuits.

Figure 2:
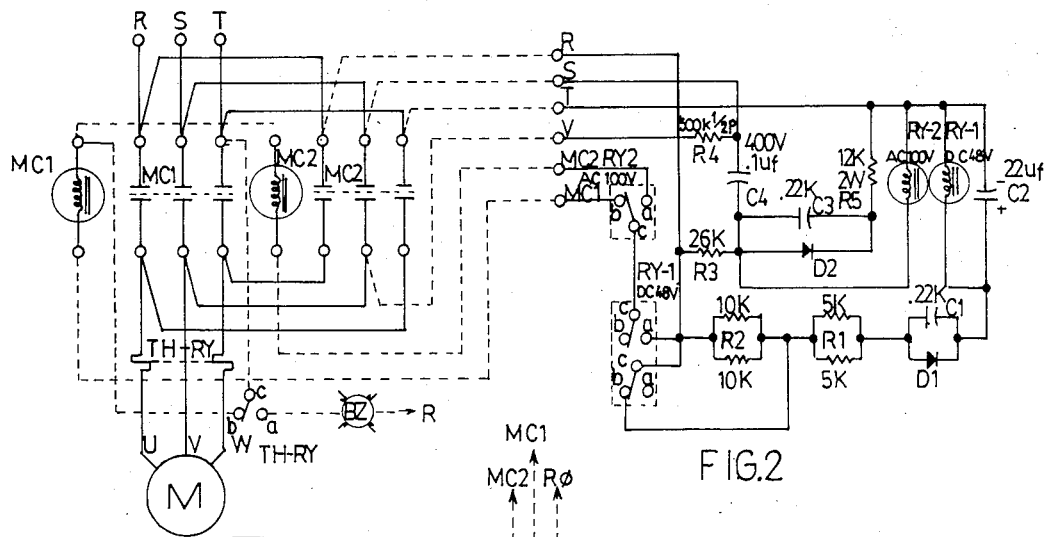
FIG. 2 is an illustration of the circuit of the phase controller of the invention.

FIG. 2 illustrates the principal circuit diagram of the invention which consists of Magnetic Contact Pieces MC1 and MC2 having respective contacts connected with each other. The input contact point of each of the three MC1 contacts "a" are bridged to the input terminals of the three MC2 contacts "a" in-phase, whilst the output terminal for the MC2 contacts "a" each go through phase conversion for bridging connection to the output terminal of the MC1 contacts "a" via means S, T, R, respectively, to provide a phase conversion mechanism, the MC1 contacts "a", at the output end are further connected to the main contact point, being protected by RT phase, on the Thermal Relay TH-RY before interconnection with the load, thereby constituting an overloading protection circuit. The phase conversion mechanism thus derived works on the same principles as does control of a motor to run in a forward or reverse direction in the wiring industry. Furthermore, it is by integration with a control circuit that the phase conversion mechanism forms a phase controller.

Figure 3:
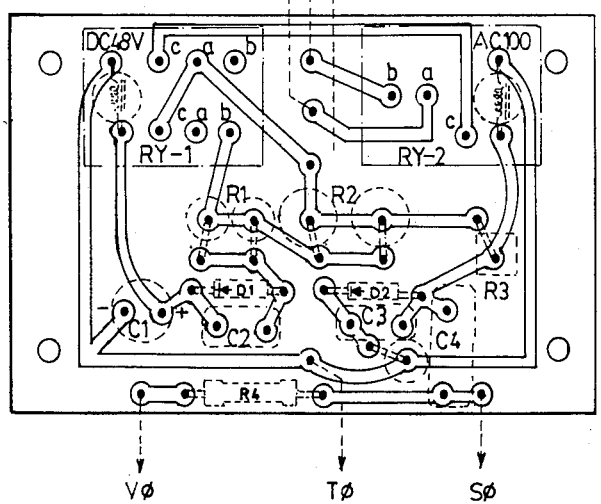
FIG. 3 is an illustration of the PC Board for the control circuit of the phase controller of the invention.

The Control Circuit hereunder, as illustrated in FIG. 2 and FIG. 3, respectively, is composed of a control Relay RY-1 with one set of dual contacts and rating DC 48 V, a phase choice relay RY-2 for rating 100 V AC, diode D, resistance R and capacitance C. Contact "b", of phase choice relay remaining in "off" position in most cases, is connected to one end of the MC1 coil, whilst contact "a", remaining in "on" position in most cases, is connected to one end of the MC2 coil. The second end of the MC1 coil, and of the MC2 coil are connected to each other and to contact "b" of the Thermal Relay TH-RY. The contact C, the common contact point, of the TH-RY is connected to phase T of the power source to allow currents of phase T to flow through the coil of either MC1 or of MC2 depending on the position of contact of phase choice relay RY-2. The coils of MC1 and MC2 are connected to point "a" and point "b", respectively, of relay RY-2. Therefore, phase choice relay RY-2 serves as a means to prevent simultaneous activation of the in-phase MC1 and the reverse-phase MC2. This kind of simultaneity would result in aggravated short circuits. The operation of the phase choice relay is described hereinafter. Since one end of each of MC1 and MC2 are connected to the control point "b" of the TH-RY relay, the joint point would skip out automatically in the event of an overloading or shorting condition in the main circuitry or in the control circuit. This results in breaking MC1 and MC2 apart to keep the device from getting burnt. In addition, the point "a" of the TH-RY may be connected to an alarm buzzer BZ for release of an alarming buzz when sensing the emergence of a skip due to overloading.

The common contact point "C" of the phase choice relay RY-2 is connected to contact point "a" in the control relay RY-1, such a contact point remaining in "on" condition in most occasions and being interconnected with phase R in the power source so that the incitation or non-incitation of the MC1 coil or of the MC2 coil is determined by the state of the control relay RY-1.

The control relay RY-1 is of a dual contact type, rated for 48 V DC. The control relay RY-1 has a coil that is connected, in series, to resistors R1, R2 and diode D1 so as to yield an output of 48 V DC by the voltage abatement. Current restriction is enforced by the presence of resistors R1, R2 and rectification by diode D2. R1 and R2, having the same resistance, are comprised of a parallel combination of two resistors, to reduce space occupied by resistors of same current-limiting capacity. The capacitor C1 in parallel with the diode D1 serves to prevent transient voltage, if any, occurring in the circuit from penetrating diode D1. Resistor R2, connected in parallel with contact point "b" of control relay RY-1, remains in "off" position for most occasions. The aforementioned parallel loop in association with contact point "b" serves to short-circuit resistor R2 prior to incitation of the control relay RY-1 coil in order to drive a comparatively larger incitation current to the control relay RY-1 coil. This is done to compensate inefficiency of small incitation currents to drive the coil of control relay RY-1 while point "b" undergoes transient state conversion during the incitation process. Such a diminution will cause a failure otherwise.

On the other hand, when a magnetic contact piece is deactivated (opened) to delay the closure time for contact points "a" on the other piece, with a view to convert the state of the phase choice relay RY-2 in the first place so as to comply with operation, a capacitor C2 is provided parallel to the coil of control relay RY-1, so as to form a delay circuit by virtue of the time of conversion. This keeps the current from dropping low due to a state-conversion of the contact points, which would fail to maintain the coil in the incited condition. The key point lies in delay of point "a" of the control relay RY-1 so that the phase conversion may be achieved first, thereby reducing occurrence, or possibility of occurrence, of flashings due to simultaneous point-to-point contacts. When the coil of control relay RY-1 is incited, contact points on both units will go through state conversion. Point "b" of control relay RY-1 separates to break off the power. The current-limiting performance due to resistance R2 cuts down the working currents in the coil. Point "a" of the control relay RY-1 closes up to permit current passage and further drive MC1 or MC2 to working state by incitation via point "b" or point "a" on the phase relay RY-2 (depending on which phase is chosen). In moments when the phase choice relay RY-2 is not working, the in-phase MC1 will generate inciting flux to bring the three-phase main circuit to in-phase conduction. On the contrary, when RY-2 is working the reverse-phase MC2 will generate flux to bring the three-phase main circuit to conduction in the reverse-phase condition.

The phase choice relay RY-2 is rated for 100 V AC. The coil of RY-2 is in series connection with a resistor R3 and also connected to phase RT of the power source. The same coil is associated with a diode D2, resistor R5 and capacitor C3 to form a bias circuit. Capacitor C3 functions, same as capacitor C1 does for RY-1, to prevent damaging a diode D2 due to transient voltage.

A capacitor C4 is further used to interconnect RY-2 with resistor R3 supplied through phase S of the power source. A resistor R4 introduced to link RY-2 coil and resistor R3, is supplied by phase V. The aforementioned combination of elements amount to a phase shifting circuit characterized in the phase shifting of 90°, in the lag, for phase V. If the power source is arranged in the order R.S.T. by 120° phase angle, then such a phase shifting circuit will result in total elimination of effective power in the circuit. In this case only illusory currents due to surmised power would pass through.

A biasing circuit in parallel with RY-2 coil produces a bias in the forward direction in the emergence of a situation wherein the forward resistance of diode D2 is well-nigh zero. In this case the current passing through RY-2 through the ramifications of R3 and R5 is too small to generate any flux incitation. When a reverse bias is produced by diode D2, the max. peak A.C. voltage will still remain lower than the working voltage, due to resistor R3, and the coil of phase choice relay RY-2 fails to become duly incited. Therefore, the current which prevails at point "b" incites the forward direction MC1 to working condition, the main contact points of MC1 being brought to closure and the load being carried on in the forward direction, accordingly. On the other hand, when the power source turns to cause a phase reversal, the phase shift circuit boosts the max. AC peak voltage to bring the voltage difference across the phase choice relay RY-2 up to the working condition. The coil, therefore, becomes duly incited, and its contact points switch to point "a" so that the reverse-phase MC2 is induced to action. At this point, the main contact point of MC2 is drawn to closure. Hence, phase conversion takes place to maintain the load in forward direction operation. The conclusion, therefore, is that the load terminal will always maintain a fixed direction running under the control circuit regardless of the power source phase condition prevailing from one instant to the next, and this serves to save the gross waste of man power and time as would be otherwise required in all safety and convenience.

I claim:
1. A phase controller for maintaining a fixed phase output in case of phase reversal of phases of a three-phase power source, comprising:
 (a) a phase change means for counter-acting the phase reversal of the power source, consisting essentially of:
  (1) an in-phase magnetic contact unit having a plurality of first input points, a plurality of first output points, and a first coil surrounding a first movable core, said first input points and said first output points being positioned on said core, said first movable core being movable such that said first input points and said first output points are brought into a circuit closure position when an in-phase operation is determined by said phase controller, and at least a second non-closure position when a reverse-phase operation is determined by said phase controller;

(2) a reverse-phase magnetic contact unit having plurality of second input points in an in-phase association with said first input points, a plurality of second output points in a reverse-phase association with said first output points, and a second coil, surrounding a second movable core, upon which said second input points and said second output points are positioned, said second movable core being movable so that said second input points and said output points are brought into a closure position when a reverse-phase operation is determined by said phase controller and a non-closure position when an in-phase operation is determined by said phase controller; and (3) a thermal relay, having three contact points and an alarm means, for protecting said phase controller by monitoring a normal operation of said phase controller as defined above, said thermal relay changing said normal operation to an emergency operation and activating said alarm means upon occurrence of an overload to the circuit or upon short circuiting in the circuit;

(b) a control circuit, comprising:

(1) a phase choice relay, having a set of phase contact points, for activating said in-phase magnetic contact unit when the three-phase power soure is in forward direction operation and for activating said reverse-phase magnetic contact unit when the three-phase power source is in reverse direction operation;

(2) a control relay for controlling an amount of power introduced to said in-phase magnetic contact unit and said reverse-phase magnetic contact unit while said phase choice relay is in transition between activation of said in-phase magnetic contact unit and said reverse-phase contact unit and when said phase choice relay has activated one of said in-phase magnetic contact unit and said reverse-phase magnetic contact unit;

(3) a delay circuit for delaying activation of one of said in-phase magnetic contact unit or said reverse-phase magnetic contact unit prior to deactivation of the other of said reverse-phase magnetic contact unit or said in-phase magnetic contact unit once a change in phase of the three-phase power source has occurred;

(4) a biasing circuit for maintaining a minimum power level for continuing operation of said phase controller during a phase transition; and (5) a phase-shifting circuit for limiting an effective power level introduced to said phase choice relay and said control relay by generating an angular variation in the phase of said power introduced to said phase controller.

2. A phase controller according to claim 1, wherein said delay circuit, having a set of delay contact points and a delaying effect, causes a change in a state-variation period for said delay contact points that is slower than the period in which said phase choice relay undergoes a transition of phase contact points so as to minimize flashing effects throughout a phase-changing process of said control circuit.

3. The phase controller of claim 1, wherein
said in-phase association and said reverse-phase association is a one-to-one mapping.

4. The phase controller of claim 1, wherein
said first input points, the corresponding second input points and the phases of said three-phase power source are associated by a one-to-one mapping.

* * * * *